United States Patent [19]

Tohzuka et al.

[11] Patent Number: 4,973,762

[45] Date of Patent: Nov. 27, 1990

[54] PROCESS FOR PRODUCTION OF POLYFLUOROIODIDE

[75] Inventors: Takashi Tohzuka, Mishima; Koji Fujiwara, Toyonaka, both of Japan

[73] Assignee: Daikin Industries Ltd., Osaka, Japan

[21] Appl. No.: 371,819

[22] Filed: Jun. 27, 1989

[30] Foreign Application Priority Data

Jun. 28, 1988 [JP] Japan ................... 63-161552

[51] Int. Cl.$^5$ ............... C07C 41/01; C07C 41/18
[52] U.S. Cl. ....................... 568/615; 568/603; 568/604; 568/614; 568/677; 570/137; 570/142; 570/174
[58] Field of Search ............... 568/615, 614, 677, 603, 568/604; 570/137, 142, 174

[56] References Cited

FOREIGN PATENT DOCUMENTS 554808  3/1958  Canada ................... 570/142

Primary Examiner—Howard T. Mars
Attorney, Agent, or Firm—Birch, Stewart, Kolasch & Birch

[57] ABSTRACT

A polyfluoroiodide is produced by reacting an acid halide of a polyfluorocarbon in a perhalogenated solvent with $I_2$ and at least one salt selected from the group consisting of an alkali metal carbonate and an alkaline earth metal carbonate.

5 Claims, No Drawings

PROCESS FOR PRODUCTION OF POLYFLUOROIODIDE

BACKGROUND OF THE INVENTION

1. Field of the Invention

The present invention relates to a process for the production of polyfluoroiodide.

Polyfluoroiodides are very useful intermediates in producing compounds which are used as active components of a waterand oil-repellent, a mold-release agent, a finish and the like, through telomerization or epoxidation of an olefinic compound with the use of a peroxide.

2. Description of the Related Art

In order to iodinate a fluorine-containing organic acid, for example, a process comprising forming a silver salt of said organic acid with for example a silver oxide and subsequently reacting the salt with iodine (U.S. Pat. No. 2,170,181, the Hunsdiecker reaction) and a process comprising reacting an alkali metal salt of the organic acid with iodine (G.B. Patent Application No. 86134) are proposed. However, in any process, there are some defects, for example, a reacting agent is expensive, building an apparatus in a commercial scale is difficult, or a yield is not satisfactory.

SUMMARY OF THE INVENTION

It is, therefore, an object of the present invention to provide a process for commercially effective production of an iodine terminated compound which is a valuable intermediate in the fluorine chemical industry due to its specific reactivity.

According to the present invention, there is provided a process for the production of a polyfluoroiodide, which process comprises reacting an acid halide of a polyfluorocarbon in a perhalogenated solvent with $I_2$ and at least one salt, preferably a carbonate selected from the group consisting of an alkali metal carbonate and an alkaline earth metal carbonate.

DETAILED DESCRIPTION OF THE INVENTION

The reaction of the present invention cannot be performed in an apparatus made of a conventional metal since iodine is used and the reaction proceeds at relatively high temperature. Thus, it is preferable to perform the present reaction in a reactor made of glass under atmospheric pressure.

The reasons for conducting the present reaction in the presence of a perhalogenated solvent are as follows:

In the present reaction, the reaction temperature is raised to approximately a decomposition temperature of the metal salt such as a carbonate. At such a temperature, iodine sublimates. Thus, not only iodine tends to block a line of the reaction system, but also a large amount of excess iodine should be used. In addition, when any hydrogen atom is contained in the solvent compound, a hydrogen terminated compound instead of an iodine terminated one may be formed. Also, in the presence of water, a hydrogenated compound may be produced. By the selection of a suitable perhalogenated solvent having a suitable boiling point, the reaction temperature can be kept constant, the blockage due to sublimation and the subsequent solidification of iodine can be prevented with reflux of the solvent, and the production of the hydrogen terminated compound can be prevented.

The boiling point of the perhalogenated solvent is usually in the range of from 180° to 260° C. and preferably in the range of from 200° to 240° C. The preferable perhalogenated solvents are, for example, perchlorobutadiene, perfluoropolyether oil, a solvent for VPS (Vapor Phase Soldering), etc. In particular, perchlorobutadiene is preferable due to the large solubility of $I_2$ therein. When an amount of perchlorobutadiene is increased, a higher yield can be achieved even when the excessive amount of iodine is in the range of from 1.1 to 2.0 times the stoichiometric amount of iodine.

The reaction temperature depends on the solvent. Usually it is in the range of from 180° to 260° C. and preferably in the range of from 200 to 240° C.

From the point of the decomposition temperature, a potassium carbonate is particularly preferred.

An amount of the carbonate to be used is from 1.1 to 10 times by molar and preferably from 1.5 to 5 times by molar relative to the acid halide as the as the starting material.

The reasons why the acid halide is used as a starting material are as follows: When a carboxylic acid is used, water is produced and the yield is decreased. Further, it is very difficult to remove water from the formed salt.

During the present reaction, an acid fluoride of the decomposed product is by-produced, which can again be reacted with iodine and the carbonate to produce the iodine terminated compound substantially stoichmetrically.

The acid halide of the polyfluorocarbon is a compound of the formula:

RfCFXCOF wherein Rf is a perfluoroalkyl or polyfluoropolyether group and X is fluorine or trifluoromethyl group.

In particular, the process according to the present invention is suitable for the production of the polyfluoroiodide from the acid halide of the polyfluoropolyether.

The polyfluoropolyether is a compound which has an acid halide group(s) at one end or both ends and which has a polymer chain comprising repeating units of the formula:

$$-(CH_2CF_2CF_2O)_a-, -(CHClCF_2CF_2O)_b-,$$

$$-(CCl_2CF_2CF_2O)_c-, -(CHFCF_2CF_2O)_d-,$$

$$-(CFClCF_2CF_2O)_e- \text{ and } -(CF_2CF_2CF_2O)_f-$$

wherein a, b, c, d, e and f are 0 or a positive integer, and satisfy inequalities of 223 $a+b+c+d+e+f \leq 200$ and $1 \leq a+c+d+f$, respectively.

Further, the polyfluoropolyether may be a compound, of for example Krytox (trade mark) available from Du Pont, comprising a repeating unit of the formula:

$$-(\underset{|}{\overset{CF_3}{C}}FCF_2O)-$$

and a compound, of for example Fomblin (trade mark) available from Montefluos.

The reaction of the present invention proceeds according to the reaction equations as follows:

$$RfCFXCOF + MCO_3 \rightarrow RfCFXCOOM + MF$$

$$RfCFXCOOM + I_2 \rightarrow RfCFXI + CO_2 + MI$$

According to the present invention, it is possible to produce the iodide commercially through only one pot reaction under atmospheric pressure in the glass reactor without corrosion.

With the perhalogenated solvent having a suitable boiling point, the reaction temperature can be kept constant. With the reflux of the solvent, the blockage due to the solidification of iodine may be prevented. Further, the production of the hydrogen terminated compound may be prevented.

With the use of an excess amount of the carbonate of the alkali metal or the alkaline earth metal relative to the acid halide, the production of the hydrogen terminated compound or the acid fluoride is prevented to increase the yield of the desired polyfluoroiodide.

The present invention will be hereinafter explained further in detail by following examples.

EXAMPLE 1

Twenty ml of well dried hexachloro-1,3-butadiene, 0.6 gram of potassium carbonate powder (4.4 millimole) and 3.3 grams of iodine (13 millimole) were supplied in a 100 ml four necked flask in a stream of nitrogen and then heated to 200° C. with stirring. Then, 12 grams of the acid fluoride of the perfluoropolyether of the formula:

$$F(CF_2CF_2CF_2O)_n-CF_2CF_2COF$$

wherein n is 34 on the average (2.1 millimole) was dropwise added into the flask. After the addition of the acid fluoride, the mixture was heated at reflux at 210° to 220° C.

After 7 hours, the reaction solution was analyzed with an infrared spectrometer and the chart from the infrared spectrometer showed absorption due to the carbonyl group disappeared but absorption due to the C-I bonds appeared at 910 cm$^{-1}$.

After the reaction mixture was recovered from the flask and filtered, the solvent was removed with a separatory funnel and dried off under vacuum to obtain 12.1 grams of the product. In the NMR and IR analyses, any impurity (a carboxylic acid terminated compound, an acid fluoride or a hydrogen terminated compound) was not detected, and the iodine terminated compound was detected.

EXAMPLE 2

In 150 ml of hexafluoro-1,3-butadiene in a 500 ml four necked flask, 12.0 grams of potassium carbonate powder (8.7×10$^{-2}$ mole) and 52 grams of iodine (0.2 mole) were dispensed in a stream of nitrogen. Then, 120 grams of the acid fluoride of the formula:

$$[-CF_2CF_2CF_2O-(CF_2CF_2CF_2O)_n-CF_2CF_2COF]_2$$

wherein n is 10 on the average (0.03 mole) was dropwise added while the temperature of the mixture was kept at 210° to 220° C. After six hours, disappearance of absorption due to the carbonyl group in the IR chart was confirmed. Then, the reaction solution was purified as in Example 1 to obtain 120 grams of the product. The yield was 95%. The product was identified to be a compound of the formula:

$$[-CF_2CF_2CF_2O-(CF_2CF_2CF_2O)_n-CF_2CF_2I]_2$$

EXAMPLE 3

In a 100 ml four necked flask, 24 ml of hexachloro-1,3-butadiene and 2.49 grams of iodine (9.84×10$^{-3}$ mole) were charged in a stream of nitrogen and mixed to obtain a solution. Then, 0.68 gram of potassium carbonate (4.92 × 10$^{-3}$ mole) was added to the solution and heated to 210° C.

Then, 12 grams of the perfluoropolyether of the formula:

$$F-(CF_2CF_2CF_2O)_n-CF_2CF_2CO$$

wherein n is 21 (3.28×10$^{-3}$ mole) was dropwise added into the flask. After the dropping, the mixture was further heated at reflux. After about seven hours, the reaction solution was analyzed with IR and it was confirmed that there is no absorption due to the carbonyl group in the chart. The reaction solution was purified as in Example 1 to obtain 12.1 grams of the product. The yield was 98%. When analyzed with IR and NMR, it is identified that the iodine terminated compound was stoichiometrically produced.

What is claimed is:

1. A process for production of a polyfluoroiodide, which process comprises reacting an acid fluoride of a polyfluoropolyether in a perhalogenated solvent having a boiling point of from 180° to 260° C. with I$_2$ and at least one salt selected from the group consisting of an alkali metal carbonate and an alkaline earth metal carbonate.

2. The process according to claim 1, wherein the boiling point of the perhalogenated solvent is from 200° to 240° C.

3. The process according to claim 1, wherein the perhalogenated solvent is perchlorobutadiene, perfluoropolyether oil or a solvent for vapor phase soldering.

4. The process according to claim 1, wherein the salt is potassium carbonate.

5. The process according to claim 1, wherein the acid fluoride of the polyfluoropolyether is a compound of the formula:

$$RfCFXCOF$$

wherein RF is a polyfluoropolyether group and X is fluorine or trifluoromethyl.

* * * * *